United States Patent
Shibutani

(10) Patent No.: US 6,573,327 B1
(45) Date of Patent: Jun. 3, 2003

(54) HIGHLY STABLE AQUEOUS SOLUTION OF PARTIALLY SAPONIFIED VINYL ESTER RESIN

(75) Inventor: Mitsuo Shibutani, Ibaraki (JP)

(73) Assignee: Nippon Gohsei Kagaku Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/402,111

(22) PCT Filed: Apr. 1, 1997

(86) PCT No.: PCT/JP97/01118
§ 371 (c)(1),
(2), (4) Date: Sep. 29, 1999

(87) PCT Pub. No.: WO98/44044
PCT Pub. Date: Oct. 8, 1998

(51) Int. Cl.[7] .......................... C08L 29/04; C08F 16/06; C08F 8/12; C08F 220/26; C08F 220/38

(52) U.S. Cl. ...................... 524/557; 524/558; 524/563; 524/564; 524/803; 524/832

(58) Field of Search .................... 524/557, 558, 524/563, 564, 803, 832

(56) References Cited

U.S. PATENT DOCUMENTS 5,849,840 A * 12/1998 Maruhashi et al. .......... 525/56

FOREIGN PATENT DOCUMENTS

| | | | | |
|---|---|---|---|---|
| DE | 40 41 737 A | 7/1991 | | |
| EP | 0 032 724 A | 7/1981 | | |
| EP | 0 043 074 A | 1/1982 | | |
| EP | 0 124 782 A | 11/1984 | | |
| EP | 0 199 358 | 10/1986 | | |
| EP | 2 239 248 A | 6/1991 | | |
| EP | 0 757 060 A | 2/1997 | | |
| FR | 2 598 711 A | 11/1987 | | |
| GB | 2 181 143 A | 4/1987 | | |
| GB | 2 239 249 | 6/1991 | | |
| JP | 54033580 A | * 3/1979 | ................. | 526/173 |
| JP | 55029579 A | * 3/1980 | ................. | 526/202 |
| JP | 4-114004 | 4/1992 | | |
| JP | 4-298506 | 10/1992 | | |
| JP | 04298506 A | * 10/1992 | ............. | C08F/8/12 |
| JP | 6-279539 | 10/1994 | | |
| JP | 7-10922 | 1/1995 | | |
| WO | WO-86/05191 | * 9/1986 | ................. | 525/56 |

\* cited by examiner

*Primary Examiner*—Kelechi Egwim
(74) *Attorney, Agent, or Firm*—Armstrong, Westerman & Hattori, LLP

(57) ABSTRACT

An aqueous solution of partially hydrolyzed vinyl ester resin having an excellent stability and useful particularly as a secondary agent for suspension polymerization of vinyl compounds, wherein the partially hydrolyzed vinyl ester resin has a degree of hydrolysis of at most 70% by mole, it is contained in a concentration of at most 50% by weight, and it satisfies the equation: $\ln y > 0.042x + 1.0$, in which y is the cloud point (° C.) of a 30% by weight aqueous solution of the partially hydrolyzed vinyl ester resin, and x is the degree of hydrolysis (% by mole) of the partially hydrolyzed vinyl ester resin.

5 Claims, No Drawings

HIGHLY STABLE AQUEOUS SOLUTION OF PARTIALLY SAPONIFIED VINYL ESTER RESIN

TECHNICAL FIELD

The present invention relates to an aqueous solution of a partially hydrolyzed vinyl ester resin which does not cause phase separation, deposition, gelation and the like of the partially hydrolyzed vinyl ester resin in the aqueous solution and has an excellent stability.

BACKGROUND ART

Partially hydrolyzed vinyl ester resins having a degree of hydrolysis of at most 70% by mole have been widely utilized as primary dispersing agents or secondary dispersing agents for suspension polymerization of vinyl compounds (particularly vinyl chloride), binders, plasticizers or hot melt adhesives.

However, partially hydrolyzed vinyl ester resins having a degree of hydrolysis of at most 70% by mole, in particular alkalihydrolyzed vinyl ester resins having a degree of hydrolysis of at most 67% by mole, are completely insoluble in water. Therefore, when these resins are used for example as a secondary agent for suspension polymerization, in general they are added in the form of a powder or they are dissolved in a water-alcohol solvent or water-ketone solvent and then added. The former procedure is poor in charging workability and also the effects as the secondary agent are not sufficiently exhibited. The latter procedure may raise a problem of environmental pollution (increase of BOD and COD loads) owing to alcohol solvent.

In order to solve such problems, proposed is a method using an aqueous dispersion containing as a dispersoid a vinyl ester polymer having amino group, ammonium group, carboxyl group or sulfo group in the side chains (Japanese Patent Publication Kokai No. 4-154810). It is also proposed to use, as a dispersion stabilizer, one or more water-soluble polyvinyl alcohols prepared by partial solvolysis of polyvinyl acetate in an alcoholic solution containing an acid catalyst (Japanese Patent Publication Kokai No. 56-104912). The present applicant also proposed a dispersion stabilizer comprising a vinyl ester resin having an oxyalkylene group in the polymer side chains and a water-soluble high molecular compound (Japanese Patent Publication Kokoku No. 3-60321).

However, according to the technique disclosed in Japanese Patent Publication Kokai No. 4-154810, there is a case where its characteristics (improvement in porosity, uniformity of porosity distribution, monomer removability, plasticizer absorptivity and the like of obtained polymers of vinyl compounds) cannot be sufficiently exhibited, the reason of which is assumed to be that the pH range (3 to 8) of the polymerization system varies depending on the amount of a buffer used in the polymerization of vinyl compounds, the opportunity of charging the buffer, the oxygen concentration of the polymerization system and the like. Further, when used as a secondary agent for suspension polymerization of vinyl monomers, there arises a problem that the suspension polymerization becomes unstable to result in production of coarse particles of polymers, the cause of which is assumed to be that protective colloid characteristics of a primary agent are lowered by the secondary agent since the hydrophilic property becomes strong. The technique disclosed in Japanese Patent Publication Kokai No. 56-104912 has the disadvantages that if the degree of hydrolysis of the polyvinyl alcohol is less than 55% by mole, it is completely insoluble in water and is unsuitable, and if the degree of hydrolysis is from 55 to 60% by mole, the aqueous solution thereof is stable at a concentration as high as 30 to 40% by weight, but the polyvinyl alcohol is deposited when diluted to a concentration of less than 30% by weight. It has also the disadvantages that the aqueous solution is easy to cause phase separation into two layers when stored because of low cloud point and that it is poor in workability in handling. In case of the technique disclosed in Japanese Patent Publication Kokoku No. 3-60321, it is not possible to prepare an aqueous solution having a high resin concentration of not less than 30% by weight and, also, the storage stability is bad. Further, even in aqueous solutions having a low resin concentration, the resin may be deposited and, therefore, inconvenience is expected also when used as a secondary agent.

DISCLOSURE OF THE INVENTION

The present inventors have found, as a result of intensive study made in view of such circumstances, that an aqueous solution containing at most 50% by weight of a partially hydrolyzed vinyl ester resin which has a degree of hydrolysis of at most 70% by mole and which satisfies the equation (I):

$$\ln y > 0.042x + 1.0 \tag{I}$$

wherein y is a cloud point (° C.) of the 30% by weight aqueous solution thereof and x is the degree of hydrolysis (% by mole) thereof, is excellent in stability of aqueous solution even if diluted to a low concentration of not more than 30% by weight, to say nothing of under a high concentration, and is suitable for use as secondary agent for suspension polymerization, binders for various purposes, plasticizer and the like, and that particularly in case of using as a secondary agent for suspension polymerization, appearance of cloud point is suppressed (miscibility with water is good) when used at ordinary temperature and no deposition occurs even if the resin concentration of the aqueous solution is as low as not more than 30% by weight, thus the solution is particularly excellent in storage stability, and further that when such an aqueous solution is added as a secondary agent to a polymerization system for suspension polymerization of vinyl compounds, it is assumed that the secondary agent can immediately exhibit an oil solubility as a partially hydrolyzed vinyl ester resin since perhaps the secondary agent cannot sufficiently include water molecules at a concentration of less than 1% by weight, so it is adsorbed by or dissolved in the vinyl monomers and, therefore, polymerization products having excellent plasticizer absorptivity and monomer removability are obtained without being affected by the polymerization conditions such as amount of a buffer used in the polymerization of vinyl compounds and pH change in the polymerization system owing to oxygen concentration or the like of the polymerization system. Thus, the present inventors have accomplished the present invention.

In accordance with the present invention, there is provided an aqueous solution of a partially hydrolyzed vinyl ester resin having an excellent stability, characterized by containing a partially hydrolyzed vinyl ester resin having a degree of hydrolysis of at most 70% by mole in a concentration of at most 50% by weight, said partially hydrolyzed vinyl ester resin satisfying the equation (I):

$$\ln y > 0.042x + 1.0 \tag{I}$$

wherein y is the cloud point (° C.) of a 30% by weight aqueous solution of said partially hydrolyzed vinyl ester resin, and x is the degree of hydrolysis (% by mole) of said partially hydrolyzed vinyl ester resin.

BEST MODE FOR CARRYING OUT THE INVENTION

The partially hydrolyzed vinyl ester resins used in the present invention are not particularly limited so long as they have a degree of hydrolysis of at most 70% by mole, and the cloud point y (° C.) of a 30% by weight aqueous solution thereof and the degree of hydrolysis x (% by mole) thereof satisfies the equation (I):

$$\ln y > 0.042x + 1.0 \tag{I}$$

Preferably, the degree of hydrolysis of the partially hydrolyzed vinyl ester resins is from 0 to 60% by mole, especially from 20 to 60% by mole, more especially from 30 to 60% by mole. If the degree of hydrolysis exceeds 70% by mole, the monomer removability, uniformity of porosity distribution and improvement in plasticizer absorptivity of polymers of vinyl compounds obtained by suspension polymerization using the partially hydrolyzed vinyl ester resins as a secondary agent are insufficient. Also, the partially hydrolyzed vinyl ester resins are preferred to be those satisfying the equation (II):

$$\ln y > 0.042x + 1.7 \tag{II}$$

wherein y is the cloud point (° C.) of a 30% by weight aqueous solution thereof and x is the degree of hydrolysis (% by mole) thereof. If the partially hydrolyzed vinyl ester resins do not satisfy the equation (I), the aqueous solution is inferior in storage stability at a high concentration and a cloud point appears under some storage conditions, and also when used as a secondary agent for suspension polymerization of vinyl compounds, the characteristics such as particle size distribution, monomer removability and plasticizer absorptivity of the obtained vinyl polymers are lowered.

Control of the relationship represented by the equation (I) can be achieved by introducing a bulky hydrophilic group into the molecule of a partially hydrolyzed vinyl ester resin to thereby adjust a balance between the degree of hydrolysis and the degree of polymerization. As the partially hydrolyzed vinyl ester resin to which a hydrophilic group has been introduced, preferred are those containing a functional group of the formula (1):

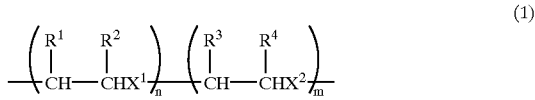

wherein $R^1$, $R^2$, $R^3$ and $R^4$ are a hydrogen atom or an alkyl group, $X^1$ and $X^2$ are an oxygen atom or a sulfur atom, n is a positive number and m is 0 or a positive number.

In the formula (1), preferable ranges of n and m are represented by the relationship of $5 \leq n+m \leq 50$, especially $8 \leq n+m \leq 20$. If n+m is less than 5, the aqueous solution of partially hydrolyzed vinyl ester resin is poor in stability. Thus, for example, if a 40% by weight aqueous solution of such a partially hydrolyzed vinyl ester resin having a degree of hydrolysis of 60% by mole is diluted to a low concentration of 3 to 20% by weight, the partially hydrolyzed vinyl ester resin is deposited. Also, the cloud point is lowered, so the above-mentioned equation (I) cannot be satisfied. If n+m is more than 50, contribution as a oil soluble component is hard to appear since the hydrophilic property becomes too strong, so the effects as secondary agent cannot be sufficiently exhibited. Also, from the industrial point of view, production cost rises.

The partially hydrolyzed vinyl ester resins having functional groups (1) can be prepared by any methods, for example, (i) a method wherein a vinyl ester is polymerized in the presence of a polyoxyalkylene polymer and the resulting polymer is then hydrolyzed, (ii) a method wherein a vinyl ester is copolymerized with an unsaturated monomer having the functional group (1) and the resulting polymer is then hydrolyzed, (iii) a method wherein a partially hydrolyzed vinyl ester resin is subjected to a post reaction with an alkylene oxide, (iv) a method wherein ethylene oxide, propylene oxide or the like is addition-polymerized to a vinyl ester resin (in a preferable embodiment, ethylene oxide and butylene oxide are addition-polymerized to a vinyl ester resin to form ethylene oxide block-butylene oxide block-ethylene oxide block having a butylene oxide content of at most 20% by weight, preferably at most 10% by weight) in the presence of a catalyst, e.g., an acid or an alkali hydroxide such as sodium hydroxide or potassium hydroxide and the resulting polymer is then hydrolyzed, and (v) a method wherein a polymer of a vinyl ester compound, to the molecular end of which a thiol-containing alkylene glycol derivative has been introduced, is hydrolyzed, the introduction being conducted in a manner such that the thiol-containing alkylene glycol derivative is made exist in the polymerization system of the vinyl ester compound wherein the addition of the thiol-containing alkylene glycol compound may be conducted prior to starting the polymerization or at an adequate opportunity during the polymerization. Of the above methods (i) to (v), the method (ii) is practical from the viewpoints of the preparation and properties of the resin.

An explanation will be given below with the method (ii) as the central figure.

Firstly, the functional group (1) is explained.

In case that both of $X^1$ and $X^2$ are oxygen atom, the functional group (1) is an oxyalklylene group represented by the formula (2):

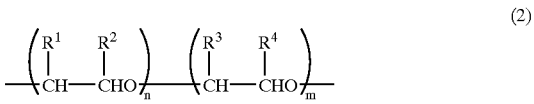

and such an oxyalkylene group is in general a group represented by the formula (3):

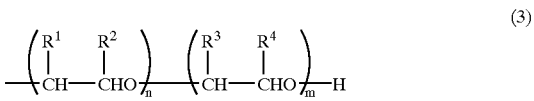

wherein $R^1$, $R^2$, $R^3$ and $R^4$ are a hydrogen atom or an alkyl group, n is a positive number and m is 0 or a positive number. Oxyalkylene groups of the formula (1) or (2) wherein the total number of n+m is from about 5 to about 50, preferably 8 to 20, are practical. For example, (poly) oxyethylene group, (poly)oxypropylene group, (poly) oxybutylene group and the like are effective, and (poly) oxyethylene group is preferable.

Unsaturated monomers having an oxyalkylene group include, for instance, the following compounds, but are not limited thereto in the present invention.

[(Meth)acrylic Acid Esters]

There are mentioned monomers of the following formula (4), examples of which are polyoxyethylene (meth)acrylate, polyoxypropylene (meth)acrylate and the like:

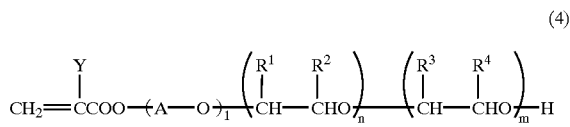

(4)

wherein Y is a hydrogen atom or a methyl group, A is a phenylene group or a substituted phenylene group, l is 0 or an integer of not less than 1, $R^1$, $R^2$, $R^3$ and $R^4$ are a hydrogen atom or an alkyl group, n is a positive number and m is 0 or a positive number, provided that n+m is from 5 to 50, preferably from 8 to 20.

[(Meth)acrylamides]

There are mentioned monomers of the following formula (5), examples of which are polyoxyethylene(meth)acrylamide, polyoxy-propylene(meth)acrylamide, polyoxyethylene( 1-(meth) acrylamide-1,1-dimethylpropyl) ester, and the like:

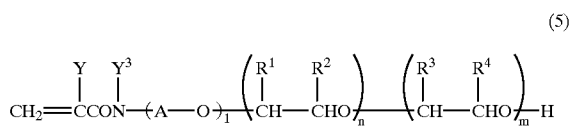

(5)

wherein $Y^3$ is a hydrogen atom, a methyl group or the group (1) or (2), and A, Y, $R^1$, $R^2$, $R^3$, $R^4$, l, n, m and n+m are as defined above.

[(Meth)allyl Alcohols]

There are mentioned monomers of the following formula (6), examples of which are polyoxyethylene (meth)allyl ether, polyoxypropylene (meth)allyl ether and the like.

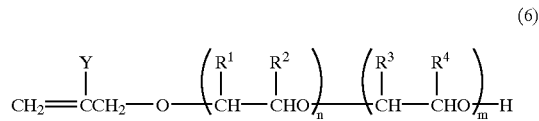

(6)

wherein Y, $R^1$, $R^2$, $R^3$, $R^4$, n, m and n+m are as defined above.

[Vinyl Ethers]

There are mentioned monomers of the following formula (7), examples of which are polyoxyethylene vinyl ether, polyoxypropylene vinyl ether and the like:

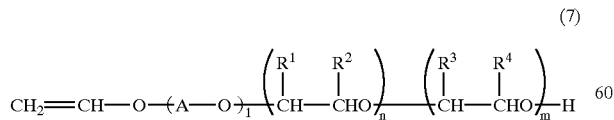

(7)

wherein A, $R^1$, $R^2$, $R^3$, $R^4$, l, n, m and n+m are as defined above.

Of these monomers containing oxyalkylene group, (meth) allyl alcohol compounds (6) are preferably used.

In the above-mentioned method (v) for preparing the partially hydrolyzed vinyl ester resin, a thiol group-containing alkylene glycol derivative of the formula (8):

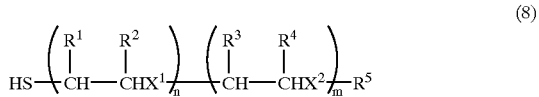

(8)

wherein $R^1$, $R^2$, $R^3$ and $R^4$ are a hydrogen atom or an alkyl group, $R^5$ is a hydrogen atom or SH, $X^1$ and $X^2$ are an oxygen atom or a sulfur atom, and n, m and n+m are as defined above,
is introduced as the functional group (1) to a vinyl ester resin. Examples of the derivative (8) are, for instance, polyethylene glycol whose both ends or one end is converted to SH.

In the present invention, it is preferable that the partially hydrolyzed vinyl ester resins contain the functional group (1), and those further containing an ionic group are more preferred so that an aqueous solution of the vinyl ester-vinyl alcohol copolymer can be handled in a wide range of dilution. The content of the ionic group is preferably from 0.05 to 1.0% by mole, more preferably from 0.1 to 1.0% by mole. Introduction of the ionic group is conducted usually by a method comprising copolymerizing a vinyl ester compound with comonomers, i.e., an unsaturated monomer having the functional group (1) and a monomer having an ionic group, and then hydrolyzing the resulting copolymer. The monomer having an ionic group is not particularly limited and includes, for instance, a carboxyl group-containing monomer, a sulfo group-containing monomer, an amino group-containing monomer, an ammonium group-containing monomer and the like.

Examples of the carboxyl group-containing monomer are, for instance, an ethylenically unsaturated dicarboxylic acid (such as maleic acid, fumaric acid or itaconic acid), an ethylenically unsaturated dicarboxylic acid monoester (such as a monoalkyl maleate, a monoalkyl fumarate or a monoalkyl itaconate), an ethylenically unsaturated dicarboxylic acid diester (such as a dialkyl maleate, a dialkyl fumarate or a dialkyl itaconate), an ethylenically unsaturated carboxylic anhydride. (such as maleic anhydride or itaconic anhydride), (meth)acrylic acid, and salts of these monomers. Of these, ethylenically unsaturated dicarboxylic acids, ethylenically unsaturated carboxylic acid monoesters, and salts thereof are preferable.

The ionic group can also be introduced into vinyl ester resins by using a compound having a functional group, e.g., an alcohol, aldehyde or thiol having carboxyl group, as a chain transfer agent. In particular, those derived from a thiol which has a large chain transferring effect are effective. Examples of the thiol are a compound of the formula (9):

(9)

wherein n is an integer of 0 to 5, or its salt;
a compound of the formula (10):

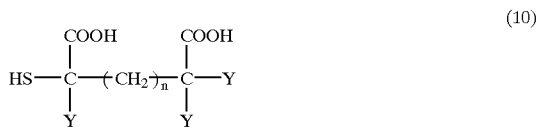

(10)

wherein Y is independently a hydrogen atom or a lower alkyl group which may contain a substituent, and n is an integer of 0 to 5, or its salt; a compound of the formula (11):

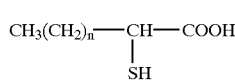

(11)

wherein n is an integer of 0 to 20, or its salt, e.g., 2-mercaptopropionic acid, 3-mercaptopropionic acid or 2-mercaptostearic acid; a compound of the formula (12):

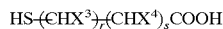

(12)

wherein $X^3$ is a hydrogen atom or a carboxyl group, $X^4$ is a hydrogen atom, r is 0 or a positive number, and s is a positive number, e.g., thioglycollic acid, thiopropionic acid or thiomalic acid; and the like.

The sulfo group-containing monomer includes, for instance, the following compounds.

(a) Olefin sulfonic acids such as ethylenesulfonic acid, allylsulfonic acid or methallylsulfonic acid, and salts thereof.

(b) Sulfoalkyl maleates represented by the formulas (13) and (14):

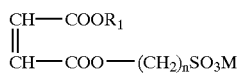

(13)

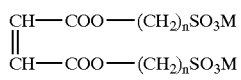

(14)

wherein $R_1$ is an alkyl group, n is an integer of 2 to 4, and M is hydrogen, an alkali metal or an ammonium ion. Examples of the sulfoalkyl maleates are sodium sulfopropyl 2-ethylhexyl maleate, sodium sulfopropyl 2-ethylhexyl maleate, sodium sulfopropyl tridecyl maleate, sodium sulfopropyl eicosyl maleate, and the like.

(c) Sulfoalkyl(meth)acrylamides represented by the formulas (15) to (17) and sulfoalkyl (meth)acrylates represented by the formula (18):

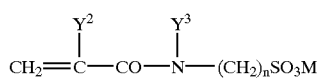

(15)

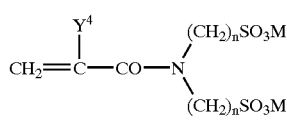

(16)

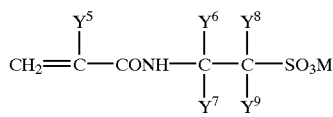

(17)

wherein $Y^2$, $Y^3$, $Y^4$, $Y^5$, $Y^7$, $Y^8$ and $Y^9$ are hYdrogen or an alkYl group, $Y^6$ is an alkyl group, n is an integer of 2 to 4, and M is hydrogen, an alkali metal or an ammonium ion. Examples of the sulfoalkyl(meth) acrylamides are sodium sulfomethylacrylamide, sodium sulfo-t-butylacrylamide, sodium sulfo-s-butylacrylamide, sodium sulfo-t-butylmethacrylamide, and the like.

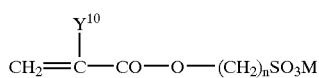

(18)

wherein $Y^{10}$ is hydrogen or an alkyl group, n is an integer of 2 to 4, and M is a hydrogen atom, an alkali metal or an ammonium ion. Examples of the sulfoalkyl (meth)acrylates are sodium sulfoethyl acrylate, and the like.

Of the above-mentioned sulfo group-containing monomers, an olefin sulfonic acid and its salt are preferably used.

The ionic group can also be introduced into vinyl ester resins by using a sulfo group-containing compound, e.g., an alcohol, aldehyde or thiol having sulfo group, as a chain transfer agent. In particular, those derived from a thiol which has a large chain transferring effect are effective. Examples of the thiol are compounds represented by the formulas (19) to (22):

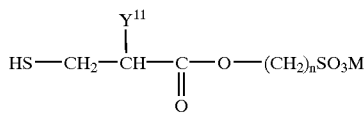

(19)

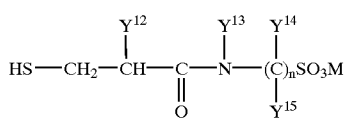

(20)

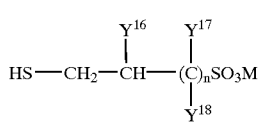

(21)

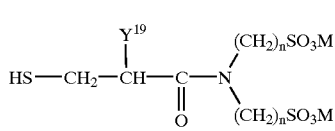

(22)

wherein each of $Y^{11}$ to $Y^{19}$ is a hydrogen atom or a methyl group, n is an integer of 2 to 4, M is a hydrogen atom, an alkali metal or an ammonium ion, and n groups of each of $Y^{14}$, $Y^{15}$, $Y^{17}$ and $Y^{18}$ may be simultaneously the same or different. Representative examples are sodium sulfopropane thiopropionate and the like.

As a method for obtaining vinyl ester-vinyl alcohol copolymers introduced with a sulfo group are also adoptable a method wherein a vinyl ester-vinyl alcohol copolymer is treated with bromine, iodine or the like and is then heated with an aqueous solution of sodium acid sulfite, a method wherein a polyvinyl alcohol is heated in a concentrated aqueous solution of sulfuric acid, and a method wherein a vinyl ester-vinyl alcohol copolymer is acetalized with an aldehyde compound having a sulfo group.

Examples of the amino group or ammonium group-containing monomers used for introducing an ionic group are, for instance, a compound of the formula (23):

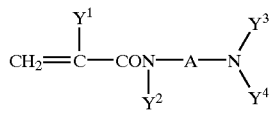
(23)

or its quaternary compound;

a compound of the formula (24):

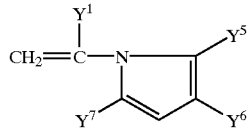
(24)

or its quaternary compound;

a compound of the formula (25):

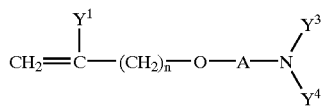
(25)

or its quaternary compound;

a compound of the formula (26):

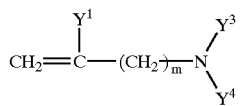
(26)

or its quaternary compound; and a compound of the formula (27):

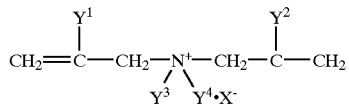
(27)

wherein n is an integer of 0 to 3, m is a positive number of 1 to 10, $Y^1$, $Y^2$, $Y^5$, $Y^6$ and $Y^7$ are a hydrogen atom or a methyl group, $Y^3$ and $Y^4$ are a lower alkyl group which may have a substituent, X is an anion which forms a salt with an ammonium nitrogen, and A is a group bonding amine or ammonium with the nitrogen atom of amido group in the compound (23) or the oxygen atom in the compound (25).

Also, adoptable is a method wherein polymerization is carried out in the presence of a chain transfer agent such as an amino group or ammonium group-containing compound, e.g., an alcohol, aldehyde or thiol compound having amino group or ammonium group. In particular, those derived from a thiol compound which has a large chain transferring effect are effective. Examples of the thiol are, for instance, a compound of the formula (28):

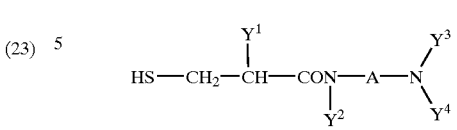
(28)

or its quaternary compound;

a compound of the formula (29):

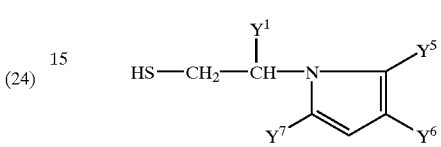
(29)

or its quaternary compound;

a compound of the formula (30):

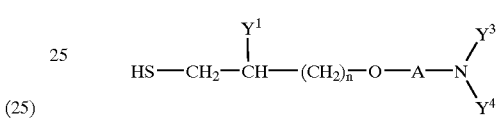
(30)

or its quaternary compound; and a compound of the formula (31):

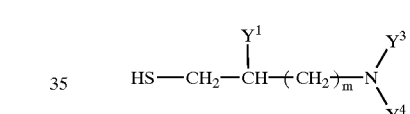
(31)

or its quaternary compound,
wherein n is an integer of 0 to 3, m is an integer of 1 to 10, $Y^1$, $Y^2$, $Y^5$, $Y^6$ and $Y^7$ are a hydrogen atom or a methyl group, $Y^3$ and $Y^4$ are a lower alkyl group which may have a substituent, and A is a group bonding the nitrogen atom of amine or ammonium with the nitrogen atom of amido group in the compound (28) or the oxygen atom in the compound (30).

Examples of a vinyl ester to be copolymerized with the above-mentioned monomers are vinyl formate, vinyl acetate, vinyl trifluroacetate, vinyl propionate, vinyl butyrate, vinyl caprate, vinyl laurate, vinyl myristate, vinyl palmitate, vinyl stearate, vinyl pivalate, and the like. These may be used alone or in admixture thereof. Vinyl acetate is industrially suitable.

In the present invention, the vinyl ester compound may be copolymerized with at most 50% by mole, preferably at most 20% by mole, of a monomer having functional group (1) as mentioned above, a monomer having an ionic group as mentioned above, other monomers copolymerizable with the vinyl ester compound, or a mixture thereof. Examples of the other monomers copolymerizable with the vinyl ester compound are give below.

[Ethylenically unsaturated dicarboxylic acid alkyl esters and the like]

There are mentioned methyl crotonate, ethyl crotonate, methyl sorbate, ethyl sorbate, alkyl oleates, methyl (meth) acrylate, ethyl (meth)acrylate, propyl (meth)acrylate, butyl (meth)acrylate, pentyl (meth)acrylate, heptyl (meth) acrylate, octyl (meth)acrylate, decyl (meth)acrylate, hexadecyl (meth)acrylate, octadecyl (meth)acrylate, and the like.

[α-Olefins]

There are mentioned ethylene, propylene, α-hexene, α-octene, α-decene, α-dodecene, α-hexadecene, α-octadecene, and the like.

[Alkyl Vinyl Ethers]

There are mentioned propyl vinyl ether, butyl vinyl ether, hexyl vinyl ether, octyl vinyl ether, decyl vinyl ether, dodecyl vinyl ether, tetradecyl vinyl ether, hexadecyl vinyl ether, octadecyl vinyl ether, and the like.

[Alkyl Allyl Ethers]

There are mentioned propyl allyl ether, butyl allyl ether, hexyl allyl ether, octyl allyl ether, decyl allyl ether, dodecyl allyl ether, tetradecyl allyl ether, hexadecyl allyl ether, octadecyl allyl ether, and the like.

Besides, (meth)acrylamide, (meth)acrylonitrile, styrene, vinyl chloride and the like are also usable.

Upon the copolymerization, the polymerization method is not particularly limited, and any known polymerization methods can be suitably used. A solution polymerization using an alcohol such as methanol, ethanol or isopropanol as a solvent is usually practiced. Emulsion polymerization, suspension polymerization and the like are also of course adoptable. As to a manner of charging monomers in such a solution polymerization, any manners can be used, e.g., a manner wherein a polymerization of a vinyl ester is started, and the remaining monomer is continuously or stepwise added during the polymerization period, a manner wherein a monomer is added at one time in the initial stage of the polymerization, and a manner wherein a vinyl ester and other monomer are simultaneously added from the initial stage of the polymerization. In case of conducting the polymerization in the presence of a chain transfer agent, it is preferable to add the chain transfer agent in accordance with the degree of reaction of the vinyl ester in the polymerization system so that the amount of chain transfer in the reaction system does not change too much with respect to the vinyl ester, thereby achieving the desired degree of modification. The copolymerization reaction is carried out by using a known radical polymerization initiator or low-temperature active catalyst, e.g., azobisisobutyronitrile, acetyl peroxide, benzoyl peroxide or lauroyl peroxide. The reaction temperature is selected from the range between about 30° C. and the boiling point of a solvent.

The vinyl ester component is converted into a vinyl alcohol component by partially hydrolyzing it. It is necessary that the degree of hydrolysis is not more than 70% by mole. Preferably, the degree of hydrolysis is from 0 to 60% by mole, especially 20 to 60% by mole, more especially from 30 to 60% by mole.

Upon the hydrolysis, the copolymer is dissolved in a solvent such as an alcohol, benzene or methyl acetate, and the hydrolysis is carried out in the presence of an alkali catalyst. Examples of the alcohol are methanol, ethanol, isopropanol, butanol and the like. The concentration of the copolymer in the alcohol is selected from 20 to 50% by weight.

As the hydrolysis catalyst are used an alkali catalyst, e.g., a hydroxide or alcoholate of an alkali metal such as sodium hydroxide, potassium hydroxide, sodium methylate, sodium ethylate or potassium methylate. The amount of such a catalyst is from 1 to 100 millimolar equivalents, preferably 1 to 50 millimoles, more preferably 1 to 30 millimoles, per mole of the vinyl ester of the monomer units.

It is also possible to carry out the hydrolysis by using an acid catalyst such as sulfuric acid or hydrochloric acid in order to further raise the storage stability of the secondary agent which comprises an aqueous solution of a partially hydrolyzed vinyl ester resin.

Thus, a partially hydrolyzed vinyl ester resin having a functional group (1) used in the present invention is obtained. The content of the functional group (1) is preferably from 0.5 to 5.0% by mole, more preferably 1.0 to 4.0% by mole, still more preferably 1.0 to 3.0% by mole. If the content is less than 0.5% by mole, the storage stability of the aqueous solution is poor. If the content exceeds 5.0% by mole, the uniformity of the porosity distribution, porosity and plasticizer absorptivity of vinyl resins obtained by suspension polymerization of vinyl compounds using the partially hydrolyzed vinyl ester resin as a dispersing stabilizer are lowered.

The content of the ionic group in the partially hydrolyzed vinyl ester resin in the present invention is preferably from 0.05 to 1.0% by mole, more preferably from 0.1 to 1.0% by mole. If the content is less than 0.05% by mole, the storage stability is lowered when the resin concentration of the aqueous solution is adjusted to less than 5%. If the content exceeds 1.0% by mole, the stability in suspension polymerization of vinyl monomers is impaired to result in production of coarse particles of the vinyl polymers for the assumed reason that the hydrophilic property becomes strong and the protective colloid characteristics of a primary agent are lowered.

An aqueous solution of the partially hydrolyzed vinyl ester resin is then prepared. The manner of obtaining such an aqueous solution is not particularly limited, and adoptable are a manner wherein the alcohol used in the hydrolysis is replaced with water by blowing of steam or the like, a manner wherein the vinyl ester resin is poured into water with stirring and the stirring is subsequently conducted, and such manners combined with heating. The manner wherein the alcohol used in the hydrolysis is replaced with water by blowing of steam or the like is preferably used.

The thus obtained aqueous solution of partially hydrolyzed vinyl ester resin of the present invention has a transparency, a good miscibility with water and a high cloud point. Also, when the resin has a specific degree of hydrolysis, for example, a degree of hydrolysis of 50% by mole, no deposition is formed even if the aqueous solution is diluted up to 2 to 3% by weight. Therefore, by utilizing the feature and the like that it is also possible to use only the aqueous solution of the present invention without using an organic solvent, the aqueous solution of the present invention can be employed in various uses where the use of organic solvents such as an alcohol has been conventionally required. Examples of the uses are as follows:

(1) Molded articles and related uses film, sheet, sealing film, temporary film, and others (2) Adhesives adhesive for wood, paper, aluminum foil, plastics and the like, tackifier, remoistening adhesive, binder for nonwoven fabric, binder for building materials such as gypsum board and fiber board, binder for granulation of various powders such as filler, additive for cement and mortar, hot melt adhesive, pressure sensitive adhesive, anchoring agent for anionic paints, and others (3) Covering materials and related uses clear coating material for paper, pigmented coating material for paper, OHP coating material, internal sizing agent for paper, sizing agent for textile goods, weft sizing agent, fiber processing agent, leather finishing agent, paint, anticlouding agent, metal corrosion inhibitor, glazing agent for galvanization, antistatic agent, conducting agent, temporary paint, and others (4) Blending agents for hydrophobic resins and related uses antistatic agent for hydrophobic resins, hydrophilic property-imparting agent, additive for films and other molded articles, compatibilizer, plasticizer, and others (5) Dispersing stabilizer for suspension and related uses
  pigment dispersing agent for paints, black writing fluid, water color, adhesive and the like, primary dispersing agent or secondary dispersing agent for suspension polymerization of vinyl chloride, styrene, methacrylic acid esters, vinyl acetate and the like, and others
(6) Dispersing stabilizer for emulsion and related uses
  emulsifier for emulsion polymerization of ethylenically unsaturated compounds and butadienic compounds, post-emulsifying agent for hydrophobic resins such as polyolefins and polyester resins, epoxy resins, paraffin, bitumen and the like, and others
(7) Thickener and related uses
  thickener for various aqueous solutions and emulsions, and others
(8) Coagulating agent and related uses
  coagulating agent for suspensoid and dissolved matter in water, and others
(9) Soil improver and related uses
(10) Uses related to photosensitive agent, electronics and photosensitive
  resist resin Of the above-mentioned uses, the aqueous solution of partially hydrolyzed vinyl ester resin of the present invention is particularly useful as a secondary agent for suspension polymerization of vinyl compounds. A process of the suspension polymerization of vinyl compounds using such an aqueous solution will be explained below.

The above-mentioned partially hydrolyzed vinyl ester resin dispersed or dissolved in water in a concentration of at most 50% by weight, preferably 1 to 45% by weight, more preferably 3 to 40% by weight, is used as the secondary agent. If the concentration of the resin exceeds 50% by weight, unsuitable matter may occur, for example, the fluidity of the aqueous solution is markedly deteriorated or the aqueous solution is gelled.

The secondary agent comprising the aqueous solution of the present invention has a good storage stability of not less than one year without particularly using a dispersing agent or an emulsifying agent.

Also, the aqueous solution of the present invention may contain an adequate amount of a known preservative such as sodium dehydroacetate, potassium sorbate or pentachlorophenol sodium salt within the range that the performances as the secondary agent are not impaired.

As a partially hydrolyzed vinyl ester resin in the secondary agent are preferred those having a viscosity of 0.5 to 10 mPa·s, especially 1.5 to 5.0 mPa·s, more especially 1.5 to 4.0 mPa·s, measured at 20° C. with respect to a 4% by weight aqueous solution of the completely hydrolyzed one. If the viscosity is less than 0.5 mPa·s, the effects as the secondary agent are not sufficiently exhibited and, therefore, the internal morphology of polymer particles obtained by suspension polymerization tends to be not sufficiently controlled (increase of internal voids of polymer particles is insufficient and also the obtained polymer particles become coarse). If the viscosity is more than 10 mPa·s, the resin concentration of the aqueous solution (secondary agent) cannot be raised, and also the fluidity of the aqueous solution (secondary agent) is deteriorated or the aqueous solution is gelled.

Upon the suspension polymerization, usually the secondary agent of the present invention and a known primary dispersing agent are added to water or hot water medium, and a vinyl monomer is then dispersed therein and the polymerization is carried out in the presence of an oil-soluble catalyst. Examples of the primary dispersing agent are a cellulose derivative such as methyl cellulose, hydroxypropyl cellulose, hydroxylpropyl methyl cellulose or carboxymethyl cellulose, gelatin, a water-soluble polymer such as polyvinyl alcohol or polyvinyl pyrrolidone, and the like. In particular, polyvinyl alcohol having a degree of hydrolysis of 65 to 90% by mole, preferably 68 to 89% by mole, and a degree of polymerization of 500 to 3,500 is preferably used as the primary dispersing agent. Although varying depending on the kind of the primary agent, it is preferable that the weight ratio of the primary agent to the secondary agent is from 90/10 to 30/70, especially 80/20 to 50/50.

The primary agent and the secondary agent may be added at one time in the initial stage of the polymerization, or may be added stepwise during the polymerization.

Further, the secondary agent of the present invention may be used in combination with a cationic, anionic or non-ionic surfactant so long as the effects of the present invention are not impaired.

The catalysts used in the suspension polymerization are not particularly limited so long as they are oil-soluble catalysts. Examples of the catalyst are, for instance, di-2-ethylhexyl peroxydicarbonate, γ-cumyl peroxyneodecanoate, benzoyl peroxide, lauroyl peroxide, diisopropyl peroxydicarbonate, α,α'-azobisisobutyronitrile, α,α'-azobis-2,4-dimethylvaleronitrile, acetylcyclohexylsulfonyl peroxide, mixtures thereof, and the like.

Further, for the purpose of preventing scaling, an appropriate amount of a water-soluble polymerization inhibitor such as ammonium thiocyanate or a nitrite may be added. A known anti-scaling agent such as "NOXOL WSW" or "NOXOL ETH" (which are products of CIRS Inc.) may also be used.

The polymerization temperature is suitably selected from the ranges known to those skilled in the art in accordance with the degree of the polymerization of desired vinyl polymers.

The monomers to be subjected to the suspension polymerization include vinyl chloride, monomers copolymerizable therewith, and other vinyl compounds. The secondary agent of the present invention is suitable for not only homopolymerization of vinyl chloride, but also preparation of copolymers of vinyl chloride with monomers copolymerizable therewith, e.g., a vinylidene halide, vinyl benzoate, acrylic, methacrylic or maleic acid and anhydride thereof, ethylene, propylene, styrene and the like. Further, the secondary agent of the present invention can also be used for suspension polymerization of any vinyl compounds such as styrene, methacrylic acid esters and vinyl acetate as well as the suspension polymerization of vinyl chloride.

The present invention is more specifically explained below by means of examples, wherein all % and parts are by weight unless otherwise noted.

EXAMPLE 1

In 3.646 kg of isopropyl alcohol were copolymerized 1.246 kg of polyoxyethylene monoalyl ether (average number of moles of ethylene oxide added: 15) and 7 kg of vinyl acetate for 8 hours with adding acetyl peroxide in amounts of 0.07% by mole (based on vinyl acetate) at the time of starting the polymerization, 0.03% by mole (based on vinyl acetate) after 2 hours, 0.03% by mole (based on vinyl acetate) after 4 hours and 0.03% by mole (based on vinyl acetate) after 6 hours (polymerization conversion 97.3%). After expelling the remaining monomers until the amount thereof became 0.06%, a solution of 6.6 millimole % (based on vinyl acetate) of sodium hydroxide dissolved in methanol was added and the hydrolysis was carried out at 35° C. for 2 hours. The obtained polymer was dried to give a polyoxyethylene group-containing partially hydrolyzed vinyl ester resin (secondary agent 1) as shown in Tables 1 and 2.

The obtained resin (secondary agent 1) was dissolved as a dispersoid or solute in water by a kneader to give an aqueous solution having a concentration shown in Table 3. The dispersibility and storage stability thereof were measured by the following methods. The results of the evaluation are shown in Table 3.

(Dispersibility)

Deposition of the modified partially hydrolyzed vinyl ester resin, formation of gel and phase separation were visually checked.

(Storage Stability)

An aqueous solution was allowed to stand at 20° C. for 12 months, and the state of dispersion (or dissolution) of the dispersoid or solute was visually observed to check occurrence of a change such as occurrence of agglomeration or deposition.

(Cloud Point)

Cloud point was measured by an integrating sphere type turbidimeter (SEP-PT-706D made by Mitsubishi Chemical Corporation) at a rate of temperature elevation of 1° C./minute.

Using a primary agent (A) (polyvinyl alcohol) and an aqueous solution of secondary agent 1 as shown in Table 4, a polymerization of vinyl chloride was carried out in the following manner and the obtained polyvinyl chloride particles were evaluated with respect to the performances as mentioned after.

An autoclave equipped with a stirrer was charged with 100 parts of vinyl chloride monomer, 150 parts of water, 0.2 part of a dilute solution of the aqueous solution of secondary agent 1 shown in Table 3 which had been diluted at the time of charging to a solid concentration of 10% in order to raise the quantitativeness of charging (0.02 part in terms of solid oxyethylene group-containing vinyl ester-vinyl alcohol copolymer), 0.08 part of a polyvinyl alcohol having a degree of polymerization of 2,200 and a degree of hydrolysis of 80% by mole as the primary agent (A) and 0.2 part of lauroyl peroxide. Suspension polymerization was carried out at 60° with stirring at 400 r.p.m. to give polyvinyl chloride particles, and the following evaluation of the polyvinyl chloride particles was conducted. The results are shown in Table 5.

(Bulk Density)

Measured according to JIS K 6721.

(Plasticizer absorptivity)

Into a planetary type mixer connected to a plastograph was placed a mixture of 60 parts of the obtained polyvinyl chloride particles and 40 parts of DOP (dioctyl phthalate). The kneading torque was measured every hour with stirring the mixture at 80°, and the time elapsed until the torque lowers was measured.

The evaluation was made according to the following criteria.

A: less than 3 minutes

B: 3 to less than 5 minutes

C: 5 minutes or more (Remaining monomer)

A predetermined amount of the obtained polyvinyl chloride particles was dissolved in THF (tetrahydrofuran), and the remaining vinyl chloride monomer was determined by a gas chromatograph.

(Fish eye)

A 0.3 mm thick sheet was prepared by roll-mixing 100 parts of the obtained polyvinyl chloride particles, 50 parts of DOP (dioctyl phthalate), 3 parts of dioctyl tin dilaurate and 1 part of zinc stearate at 155° C. for 3 minutes, and the number of fish eyes per 100 mm×100 mm was measured.

The evaluation was made according to the following criteria.

A: 0 to 4 fish eyes

B: 5 to 10 fish eyes

C: 11 fish eyes or more (Scaling)

After taking out a slurry of a polymer from the polymerization vessel, the state of scaling inside the vessel was visually observed and evaluated according to the following criteria.

A: No scale is present, and the metallic gloss inside the polymerization vessel is observed.

B: The metallic gloss inside the polymerization vessel is not vivid.

C: Scale in the form of a film is observed on the entire inner surface of the polymerization vessel.

EXAMPLES 2 TO 10 AND COMPARATIVE EXAMPLE 1

Oxyalkylene group-containing partially hydrolyzed vinyl ester resins (secondary agents 2 to 7 and secondary agent 17) and a mercaptoalkylene group-containing partially hydrolyzed vinyl ester resin (secondary agent 8) as shown in Tables 1 and 2 were produced according to the procedure of Example 1, and aqueous solutions shown in Table 3 were prepared and evaluated in the same manner. In the production of secondary agent 8, a both end thiol-modified derivative of polyethylene glycol was used instead of polyoxyethylene monoallyl ether used in Example 1.

The results of evaluation are shown in Table 3.

Further, polymerization of vinyl chloride was carried out according to the procedure of Example 1 by using the primary agent (A) and an aqueous solution of each of secondary agents 2 to 8 as shown in Table 4. The obtained polyvinyl chloride particles were evaluated in the same manner as in Example 1. The results of the evaluation are shown in Table 5.

The secondary agent 17 obtained in Comparative Example 1 was poor in dispersibility as shown in Table 3 and, therefore, no polymerization of vinyl chloride was conducted.

EXAMPLE 11

In 3.646 kg of isopropyl alcohol were copolymerized 1.246 kg of polyoxyethylene monoallyl ether (average number of moles of ethylene oxide added: 15), 3.8 g of a 60% methanol solution of monomethyl maleate and 7 kg of vinyl acetate for 7 hours, while continuously adding dropwise 102 g of a 60% methanol solution of monomethyl maleate and adding acetyl peroxide in amounts of 0.07% by mole (based on vinyl acetate) at the time of starting the polymerization, 0.03% by mole (based on vinyl acetate) after 2 hours, 0.03% by mole (based on vinyl acetate) after 4 hours and 0.03% by mole (based on vinyl acetate) after 6 hours (polymerization conversion 95%). After expelling the remaining monomers until the amount thereof became 0.08%, a solution of 6.6 millimole % (based on vinyl acetate) of sodium hydroxide dissolved in methanol was added and the hydrolysis was carried out at 35° C. for 2 hours. The obtained polymer was dried to give a polyoxyethylene group-containing partially hydrolyzed vinyl ester resin (secondary agent 9) as shown in Table 1.

The obtained resin (secondary agent 9) was dissolved in water by a kneader to give an aqueous solution having a concentration shown in Table 3. The dispersibility and storage stability thereof were measured in the same manner as in Example 1. The results of the evaluation are shown in Table 3.

EXAMPLES 12 to 20

Partially hydrolyzed vinyl ester resins containing oxyalkylene group and ionic group (secondary agents 10 to 16) as shown in Tables 1 and 2 were produced according to the procedure of Example 1, and aqueous solutions shown in Table 3 were prepared and evaluated in the same manner as in Example 1. The results of evaluation are shown in Table 3.

Further, polymerization of vinyl chloride was carried out according to the procedure of Example 1 by using the primary agent (A) and an aqueous solution of each of secondary agents 10 to 16 as shown in Table 4. The obtained polyvinyl chlorides were evaluated in the same manner as in Example 1.

The results of the evaluation of polyvinyl chloride polymerization in Examples 12 to 20 are shown in Table 5.

TABLE 1

|  | Oxyalkylene group | | Mercaptoalkylene group | | Ionic group | |
| --- | --- | --- | --- | --- | --- | --- |
| | Kind | Content (mole %) | Kind | Content (mole %) | Kind | Content (mole %) |
| Secondary agent 1 | I-a | 2 | — | — | — | — |
| Secondary agent 2 | I-a | 2 | — | — | — | — |
| Secondary agent 3 | I-a | 2 | — | — | — | — |
| Secondary agent 4 | I-b | 2 | — | — | — | — |
| Secondary agent 5 | I-c | 1 | — | — | — | — |
| Secondary agent 6 | I-d | 3 | — | — | — | — |
| Secondary agent 7 | I-a | 2 | — | — | — | — |
| Secondary agent 8 | — | — | II | 0.6 | — | — |
| Secondary agent 9 | I-a | 2 | — | — | III | 0.6 |
| Secondary agent 10 | I-a | 2 | — | — | IV | 0.4 |
| Secondary agent 11 | I-a | 1 | — | — | V | 0.6 |
| Secondary agent 12 | I-a | 2 | — | — | VI | 0.2 |
| Secondary agent 13 | I-b | 2 | — | — | VII | 0.5 |
| Secondary agent 14 | I-c | 2 | — | — | VIII | 0.7 |
| Secondary agent 15 | I-d | 3 | — | — | III | 0.8 |
| Secondary agent 16 | I-a | 2 | — | — | III | 0.6 |
| Secondary agent 17 | I-a | 0.3 | — | — | — | — |

(Notes) The kinds of oxyalkylene group, mercaptoalkylene group and ionic group are shown below, wherein the number in the parentheses denotes the average number of moles of addition of the group.
I-a: Polyoxyethylene monoallyl ether (n = 15)
I-b: Polyoxyethylene acrylamide (n = 30)
I-c: Polyoxyethylene vinyl ether (n = 50)
I-d: Polyoxyethylene monoallyl ether (n = 8)
II: Thiol-modified compound that the both ends are modified with thiol, HS-PEO-SH (molecular weight 2,000)
III: Monomethyl maleate
IV: Itaconic acid
V: 2-Mercaptopropionic acid
VI: Sodium allylsulfonate
VII: N-vinylimidazole
VIII: Sodium methallylsulfonate (Notes) The kinds of oxyalkylene group, mercaptoalkylene group and ionic group are shown below, wherein the number in the parentheses denotes the average number of moles of addition of the group.
I-a: Polyoxyethylene monoallyl ether (n=15)
I-b: Polyoxyethylene acrylamide (n=30)
I-c: Polyoxyethylene vinyl ether (n=50)
I-d: Polyoxyethylene monoallyl ether (n=8)
II: Thiol-modified compound that the both ends are modified with thiol, HS-PEO-SH (molecular weight 2,000)
III: Monomethyl maleate
IV: Itaconic acid
V: 2-Mercaptopropionic acid
VI: Sodium allylsulfonate
VII: N-vinylimidazole
VIII: Sodium methallylsulfonate

TABLE 2

| | Degree of hydrolysis x (mole %) | Clound point y (° C.) | Equation (I)* | Viscosity at 4% (mPas) |
| --- | --- | --- | --- | --- |
| Secondary agent 1 | 45 | 45 | satisfied | 3 |
| Secondary agent 2 | 45 | 43 | satisfied | 1 |
| Secondary agent 3 | 45 | 47 | satisfied | 5 |
| Secondary agent 4 | 45 | 49 | satisfied | 3 |
| Secondary agent 5 | 50 | 52 | satisfied | 2 |
| Secondary agent 6 | 45 | 47 | satisfied | 5 |
| Secondary agent 7 | 60 | 75 | satisfied | 3 |
| Secondary agent 8 | 58 | 70 | satisfied | 3 |
| Secondary agent 9 | 45 | 47 | satisfied | 3 |
| Secondary agent 10 | 45 | 48 | satisfied | 5 |
| Secondary agent 11 | 35 | 25 | satisfied | 2 |
| Secondary agent 12 | 40 | 40 | satisfied | 1 |
| Secondary agent 13 | 50 | 75 | satisfied | 2 |
| Secondary agent 14 | 45 | 48 | satisfied | 3 |
| Secondary agent 15 | 60 | >80 | satisfied | 3 |
| Secondary agent 16 | 45 | 45 | satisfied | 0.3 |
| Secondary agent 17 | 45 | ** | ** | 3 |

(Notes)
*ln y > 0.042x + 1.0
**It was impossible to prepare a 30% aqueous solution (due to separation).

The degree of hydrolysis denotes a degree of hydrolysis of the vinyl acetate component.

The viscosity at 4% denotes a viscosity value obtained by completely hydrolyzing the copolymer and measuring the viscosity of a 4% aqueous solution of the complete hydrolysis product at 20° C.

TABLE 3

| | Aqueous solution | | | |
| --- | --- | --- | --- | --- |
| | Kind | Concentration (%) | Dispersibility | Storage stability |
| Ex. 1 | Secondary agent 1 | 40 | No separation, no deposition, etc. | No change |
| Ex. 2 | Secondary agent 2 | 40 | No separation, no deposition, etc. | " |
| Ex. 3 | Secondary agent 3 | 40 | No separation, no deposition, etc. | " |
| Ex. 4 | Secondary agent 1 | 10 | No separation, no deposition, etc. | " |
| Ex. 5 | Secondary agent 4 | 45 | No separation, no deposition, etc. | " |
| Ex. 6 | Secondary agent 5 | 40 | No separation, no deposition, etc. | " |
| Ex. 7 | Secondary agent 6 | 30 | No separation, no deposition, etc. | " |
| Ex. 8 | Secondary agent 7 | 40 | No separation, no deposition, etc. | " |
| Ex. 9 | Secondary agent 7 | 5 | No separation, no deposition, etc. | " |
| Ex. 10 | Secondary agent 8 | 10 | No separation, no deposition, etc. | " |
| Ex. 11 | Secondary agent 9 | 40 | No separation, no deposition, etc. | " |
| Ex. 12 | Secondary agent 10 | 8 | No separation, no deposition, etc. | " |

TABLE 3-continued

| | Aqueous solution | | | |
|---|---|---|---|---|
| | Kind | Concentration (%) | Dispersibility | Storage stability |
| Ex. 13 | Secondary agent 11 | 30 | No separation, no deposition, etc. | " |
| Ex. 14 | Secondary agent 12 | 45 | No separation, no deposition, etc. | " |
| Ex. 15 | Secondary agent 13 | 15 | No separation, no deposition, etc. | " |
| Ex. 16 | Secondary agent 14 | 40 | No separation, no deposition, etc. | " |
| Ex. 17 | Secondary agent 15 | 5 | No separation, no deposition, etc. | " |
| Ex. 18 | Secondary agent 9 | 3 | No separation, no deposition, etc. | " |
| Ex. 19 | Secondary agent 12 | 3 | No separation, no deposition, etc. | " |
| Ex. 20 | Secondary agent 16 | 40 | No separation, no deposition, etc. | " |
| Com. Ex. 1 | Secondary agent 17 | 40 | There is deposite. | ‡ |

‡The storage stability was not evaluated since the dispersibility was bad.

TABLE 4

| | Secondary agent | | Primary agent (A) | | |
|---|---|---|---|---|---|
| | Kind | Amount (part)* | Degree of polymerization | Degree of hydrolysis (mole %) | Amount (part) |
| Ex. 1 | Aqueous solution of secondary agent 1 | 0.02 | 2400 | 80 | 0.08 |
| Ex. 2 | Aqueous solution of secondary agent 2 | 0.02 | 2200 | 80 | 0.08 |
| Ex. 3 | Aqueous solution of secondary agent 3 | 0.02 | 700 | 72 | 0.01 |
| Ex. 4 | Aqueous solution of secondary agent 1 | 0.02 | 2200 | 78 | 0.06 |
| Ex. 5 | Aqueous solution of secondary agent 4 | 0.02 | 2200 | 76 | 0.07 |
| Ex. 6 | Aqueous solution of secondary agent 5 | 0.04 | 3000 | 80 | 0.04 |
| Ex. 7 | Aqueous solution of secondary agent 6 | 0.02 | 2206 | 76 | 0.07 |
| Ex. 8 | Aqueous solution of secondary agent 7 | 0.03 | 800 | 72 | 0.08 |
| Ex. 9 | Aqueous solution of secondary agent 7 | 0.03 | 800 | 72 | 0.08 |
| Ex. 10 | Aqueous solution of secondary agent 8 | 0.03 | 800 | 72 | 0.08 |
| Ex. 11 | Aqueous solution of secondary agent 9 | 0.02 | 2200 | 80 | 0.08 |
| Ex. 12 | Aqueous solution of secondary agent 10 | 0.02 | 700 | 72 | 0.07 |
| Ex. 13 | Aqueous solution of secondary agent 11 | 0.02 | 1700 | 80 | 0.08 |
| Ex. 14 | Aqueous solution of secondary agent 12 | 0.02 | 2400 | 80 | 0.08 |
| Ex. 15 | Aqueous solution of secondary agent 13 | 0.04 | 3000 | 80 | 0.04 |
| Ex. 16 | Aqueous solution of secondary agent 14 | 0.02 | 2200 | 76 | 0.07 |
| Ex. 17 | Aqueous solution of secondary agent 15 | 0.03 | 800 | 72 | 0.08 |
| Ex. 18 | Aqueous solution of secondary agent 9 | 0.02 | 2200 | 80 | 0.08 |
| Ex. 19 | Aqueous solution of secondary agent 12 | 0.02 | 2200 | 80 | 0.08 |
| Ex. 20 | Aqueous solution of secondary agent 16 | 0.02 | 2200 | 80 | 0.08 |

*Denote the amount of solid matter in the aqueous solution.

TABLE 5

| | Bulk density (g/cc) | Plasticizer absorptivity | Remaining monomer (p.p.m.) | Fish eye | Scaling |
|---|---|---|---|---|---|
| Example 1 | 0.552 | A | 0.3 | A | A |
| Example 2 | 0.532 | A | 0.3 | A | A |
| Example 3 | 0.600 | A | 0.4 | A | A |
| Example 4 | 0.530 | A | 0.3 | A | A |
| Example 5 | 0.538 | A | 0.6 | A | A |
| Example 6 | 0.540 | B | 0.4 | B | A |
| Example 7 | 0.549 | A | 0.3 | A | A |
| Example 8 | 0.530 | A | 0.2 | A | A |
| Example 9 | 0.530 | A | 0.2 | A | A |
| Example 10 | 0.530 | A | 0.2 | A | A |
| Example 11 | 0.559 | A | 0.3 | A | A |
| Example 12 | 0.531 | A | 0.2 | A | A |
| Example 13 | 0.539 | A | 0.2 | A | A |
| Example 14 | 0.563 | A | 0.3 | A | A |
| Example 15 | 0.549 | A | 0.7 | A | A |
| Example 16 | 0.545 | A | 0.4 | A | A |
| Example 17 | 0.530 | A | 0.2 | A | A |
| Example 18 | 0.554 | A | 0.2 | A | A |
| Example 19 | 0.565 | A | 0.3 | A | A |
| Example 20 | 0.532 | A | 0.9 | A | A |

INDUSTRIAL APPLICABILITY

The aqueous solution of partially hydrolyzed vinyl ester resin of the present invention has an excellent storage stability and is a stable aqueous solution such that no resin is deposited even if diluted with water to a low concentration (is an aqueous solution having a good miscibility with water). It is very useful for use as a secondary agent for suspension polymerization of vinyl compounds, and other uses such as adhesive and plasticizer.

What is claimed is:

1. An aqueous solution of a partially hydrolyzed oxyalkylene group-containing vinyl ester resin having a degree of hydrolysis of 20 to 60% by mole, the concentration of the partially hydrolyzed oxyalkylene group-containing vinyl ester resin in the aqueous solution being from 30 to 50% by weight, wherein said partially hydrolyzed vinyl ester resin is prepared by copolymerizing a vinyl ester with an unsaturated monomer having an oxyalkylene group of the following formula (2):

consisting of a hydrogen atom, a methyl group, a group of formula (2) above, and a group of the following formula (1):

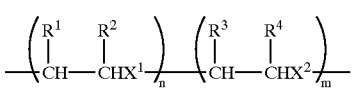
(1)

wherein $R^1$, $R^2$, $R^3$, $R^4$, n, m, and n+m are as defined above, and $X^1$ and $X^2$ are the same or different, and each of $X^1$ and $X^2$ is selected from the group consisting of an oxygen atom and a sulfur atom,

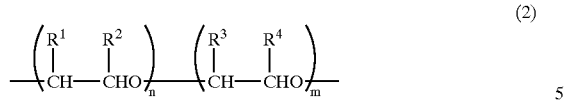
(2)

wherein $R^1$, $R^2$, $R^3$ and $R^4$ are the same or different, and each of $R^1$, $R^2$, $R^3$ and $R^4$ is selected from the group consisting of a hydrogen atom and an alkyl group, n is a positive number and m is 0 or a positive number, and $8 \leq n+m \leq 20$, and partially hydrolyzing the resulting vinyl ester copolymer, the content of said oxyalkylene group being from 0.5 to 5.0% by mole, said partially hydrolyzed vinyl ester resin satisfying the equation (I):

$$\ln y > 0.042x + 1.0 \tag{1}$$

wherein y is the cloud point (° C.) of a 30% by weight aqueous solution of said partially hydrolyzed vinyl ester resin, and x is the degree of hydrolysis (% by mole) of said partially hydrolyzed vinyl ester resin, and the viscosity at 20° C. of a 4% by weight aqueous solution of a complete hydrolysis product of said partially hydrolyzed vinyl ester resin is from 1.5 to 5.0 mPa·s, said monounsaturated monomer having an oxyalkylene group selected from the group consisting of oxyalkylene groups of the following formulas (4) to (7):

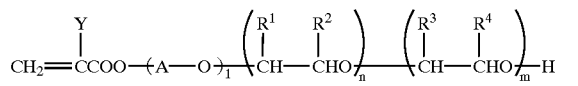
(4)

wherein $R^1$, $R^2$, $R^3$, $R^4$, n, m, and n+m are as defined above, A is a phenylene group or a substituted phenylene group, Y is a hydrogen atom or a methyl group, and 1 is 0 or an integer of not less than 1,

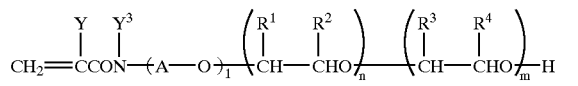
(5)

wherein A, Y, $R^1$, $R^2$, $R^3$, $R^4$, 1, n, m, and n+m are as defined above, and $Y^3$ is selected from the group

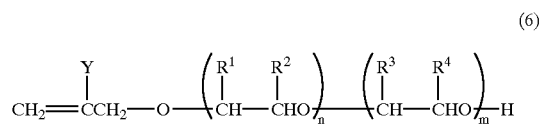
(6)

wherein Y, $R^1$, $R^2$, $R^3$, $R^4$, n, m, and n+m are as defined above, and

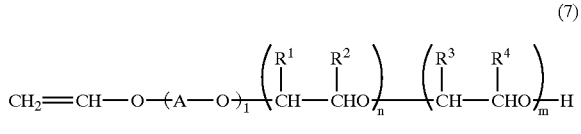
(7)

wherein A, $R^1$, $R^2$, $R^3$, $R^4$, 1, n, m, and n+m are as defined above.

2. The aqueous solution of claim 1, which is used as a secondary agent for suspension polymerization of vinyl compounds.

3. The aqueous solution of claim 1 or 2, wherein said partially hydrolyzed vinyl ester resin contains an ionic group.

4. The aqueous solution of claim 1, wherein the concentration of the partially hydrolyzed oxyalkylene group-containing vinyl ester resin in the aqueous solution is from 30 to 40% by weight.

5. The aqueous solution of claim 1, wherein the cloud point y (° C.) of a 30% by weight aqueous solution of said partially hydrolyzed vinyl ester resin is 25° C. or higher.

* * * * *